US008503582B2

United States Patent
Ibing et al.

(10) Patent No.: US 8,503,582 B2
(45) Date of Patent: Aug. 6, 2013

(54) RECEIVER

(75) Inventors: Andreas Ibing, Berlin (DE); Holger Boche, Berlin (DE)

(73) Assignee: Technische Universitat Berlin, Berlin (DE)

( * ) Notice: Subject to any disclaimer, the term of this patent is extended or adjusted under 35 U.S.C. 154(b) by 331 days.

(21) Appl. No.: 12/923,534

(22) Filed: Sep. 27, 2010

(65) Prior Publication Data

US 2012/0076230 A1    Mar. 29, 2012

(51) Int. Cl.
H04L 27/06    (2006.01)

(52) U.S. Cl.
USPC .......................................... 375/340; 375/341

(58) Field of Classification Search
USPC .. 375/340, 130, 260, 316, 326, 341; 441/173, 441/180; 455/39, 73; 714/795
See application file for complete search history.

(56) References Cited

U.S. PATENT DOCUMENTS

| | | | | |
|---|---|---|---|---|
| 6,184,942 | B1 * | 2/2001 | Patel et al. | 348/726 |
| 8,165,238 | B2 * | 4/2012 | Umehara | 375/260 |
| 2002/0181604 | A1 | 12/2002 | Chen | |
| 2005/0157817 | A1 | 7/2005 | Meyer | |
| 2008/0112308 | A1 | 5/2008 | Cleveland | |
| 2009/0044083 | A1 * | 2/2009 | Azenkot et al. | 714/792 |

FOREIGN PATENT DOCUMENTS

| WO | WO-2004/040806 A1 | 5/2004 |
|---|---|---|
| WO | WO-2010/027308 A1 | 3/2010 |

OTHER PUBLICATIONS

E-Utra and E-Utran, Overall description, Stage 2, 3 GPP TS 36.300v8.12.0, 2010. (www.3gpp.org).
Saito, et al. "Trends in LTE/WiMAX Systems" Fujitsu Sci. Tech. J., Oct. 2009, vol. 45, No. 4, pp. 355-362.
Stevenson, et al. "IEEE 802.22: The First Cognitive Radio Wireless Regional Area Network Standard" IEEE Communications Magazine, Jan. 2009, pp. 130-138.
Arslan, et al. "Iterative Co-Channel Interference Cancellation in Narrowband Mobile Radio Systems", IEEE Emerging Technologies Symposium: Broadband, Wireless Internet Access, Apr. 10, 2000, pp. 1-5.
International Search Report & Written Opinion in PCT/EP2011/064519 dated Jan. 16, 2012.

* cited by examiner

*Primary Examiner* — Khai Tran
(74) *Attorney, Agent, or Firm* — Foley & Lardner LLP

(57) ABSTRACT

A receiver is provided to receive a secondary bitstream which is transmitted by a secondary signal together with a primary signal. The receiver includes a down-converter configured to convert an input signal containing the primary and secondary signals, to a baseband complex symbol stream, A first processing unit processes the baseband complex symbol stream and provides a primary bitstream transmitted by the primary signal or a decoded primary log-likelihood ratio stream. A symbol reconstructing unit is configured to process the primary bitstream or the decoded primary log-likelihood ratio stream and to provide a reconstructed primary symbol stream. A subtraction unit is configured to provide a difference symbol stream by substracting the baseband complex symbol stream and the reconstructed primary symbol stream from each other. A second processing unit is provided to process the difference symbol stream and to provide the secondary bitstream transmitted by the secondary signal.

18 Claims, 12 Drawing Sheets

RECEIVER

The present invention relates to receivers, and more particularly to receivers for receiving weak signals that are mixed with stronger signals.

BACKGROUND OF THE INVENTION

The data transmission in today's communication systems is limited by interference when communication devices use different communication standards on the same physical transmission channels. Prior art countermeasures are based on "interference randomization" and "interference coordination" as described in "E-UTRA and E-UTRAN, Overall description, stage 2", 3GPP TS 36.300v8.12.0, April 2010, (www.3ppp.org/ftp/Specs/html-info/36300.htm).

OBJECTIVE OF THE PRESENT INVENTION

An objective of the present invention is to provide a receiver and a method that allow receiving a weak signal even in case of interference with a stronger signal.

A further objective of the present invention is to provide a system that allows transmitting a weak signal and a strong signal together.

BRIEF SUMMARY OF THE INVENTION

An embodiment of the invention relates to a receiver capable of receiving a secondary bitstream which is transmitted by a secondary signal over a physical transmission channel together with a primary signal having higher signal strength than the secondary signal, said primary signal being generated according to a first transmission standard and said secondary signal being generated according to a second transmission standard, which differs from the first transmission standard; said receiver comprising: a down-converter configured to convert an input signal that contains said primary and secondary signal, to a baseband complex symbol stream; a first signal processing unit configured to process the baseband complex symbol stream and to provide a primary bitstream transmitted by said primary signal or a decoded primary log-likelihood ratio stream; a symbol reconstructing unit configured to process the primary bitstream or the decoded primary log-likelihood ratio stream and to provide a reconstructed primary symbol stream; a subtraction unit configured to provide a difference symbol stream by substracting the baseband complex symbol stream and the reconstructed primary symbol stream from each other, said difference symbol stream describing the baseband complex symbol stream without primary signal; and a second signal processing unit configured to process the difference symbol stream and to provide the secondary bitstream transmitted by said secondary signal.

According to this embodiment, the receiver may first detect the primary bitstream or the corresponding decoded primary log-likelihood ratio stream. This is possible as the primary signal is stronger than the secondary signal. Thereafter, the receiver may calculate the influence of the primary signal on the baseband complex symbol stream and calculate a corrected baseband complex symbol stream which does not contain any significant influence of the primary signal. In other words, the primary signal is removed. Then, the corrected baseband complex symbol stream may be evaluated in the same fashion as if the secondary signal would have been transmitted alone, i.e. without any interference of a stronger signal.

According to a first preferred embodiment, the first signal processing unit comprises a first channel estimator configured to provide first estimated channel samples describing channel distortions imposed to the primary signal by the physical transmission channel; a first equalizer configured to equalize the baseband complex symbol stream and to provide a first equalized symbol stream; and a first demapper and a first decoder, said first demapper and said first decoder configured to process the first equalized symbol stream and to provide the primary bitstream.

According to a second preferred embodiment, the first signal processing unit comprises a first channel estimator configured to provide first estimated channel samples describing channel distortions imposed to the primary signal by the physical transmission channel; a first equalizer configured to equalize the baseband complex symbol stream and to provide the first equalized symbol stream; a first demapper configured to process the first equalized symbol stream and to provide a first log-likelihood ratio stream; and a first decoder configured to process the first log-likelihood ratio stream and to provide a decoded primary log-likelihood ratio stream.

The first signal processing unit may further comprise a converter configured to convert the decoded primary log-likelihood ratio stream into the primary bitstream.

Further the first equalizer may be configured to provide said first equalized symbol stream by calculating a deconvolution between the first estimated channel samples and the baseband complex symbol stream.

The symbol reconstructing unit preferably comprises a first encoder configured to process the primary bitstream or the decoded primary log-likelihood ratio stream and to provide an encoded first signal bitstream; a first mapper configured to process the encoded first signal bitstream and to provide a first signal symbol stream; and a distortion unit configured to distort the first signal symbol stream and to provide said reconstructed primary symbol stream, said distortion unit distorting the first signal symbol stream based on said first estimated channel samples provided by said first channel estimator.

The distortion unit may be configured to provide said first signal symbol stream by calculating a convolution between the first estimated channel samples of the first channel estimator and the first signal symbol stream.

The second signal processing unit preferably comprises a second channel estimator configured to provide second estimated channel samples describing channel distortions imposed to the secondary signal by the physical transmission channel; a second equalizer configured to equalize the difference symbol stream and to provide a second equalized symbol stream; a second demapper configured to process the second equalized sample stream and to provide a second log-likelihood ratio stream; and a second decoder configured to process the second log-likelihood ratio stream and to provide a decoded secondary log-likelihood ratio stream.

The second signal processing unit may further comprise a converter configured to convert the decoded secondary log-likelihood ratio stream into the secondary bitstream.

The second signal processing unit preferably comprises a second channel estimator configured to provide second estimated channel samples describing channel distortions imposed to the secondary signal by the physical transmission channel; a second equalizer configured to equalize the difference symbol stream and to provide a second equalized symbol stream; a second demapper and a second decoder, said second demapper and said second decoder configured to process the second equalized sample stream and to provide the secondary bitstream.

According to another preferred embodiment, (a) said first signal processing unit comprises
- a first channel estimator configured to provide first estimated channel samples describing channel distortions imposed to the primary signal by the physical transmission channel;
- a first equalizer configured to equalize the baseband complex symbol stream and to provide a first equalized symbol stream, wherein the first equalizer is configured to provide said first equalized symbol stream by calculating a deconvolution between the first estimated channel samples and the baseband complex symbol stream;
- a first demapper configured to process the first equalized sample stream and to provide a first log-likelihood ratio stream; and
- a first decoder configured to process the first log-likelihood ratio stream and to provide a decoded primary log-likelihood ratio stream;

(b) said symbol reconstructing unit comprises
- a first encoder configured to process the primary bitstream or the decoded primary log-likelihood ratio stream and to provide an encoded first signal bitstream;
- a first mapper configured to process the encoded first signal bitstream and to provide a first signal symbol stream; and
- a distortion unit configured to distort the first signal symbol stream and to provide said reconstructed primary symbol stream, said distortion unit distorting the first signal based on said first estimated channel samples provided by said first channel estimator, wherein the distortion unit is configured to provide said first signal symbol stream by calculating a convolution between the first estimated channel samples and the first signal symbol stream; and (c) said second signal processing unit comprises
- a second channel estimator configured to provide second estimated channel samples describing channel distortions imposed to the secondary signal by the physical transmission channel;
- a second equalizer configured to equalize the difference symbol stream and to provide a second equalized symbol stream;
- a second demapper configured to process the second equalized sample stream and to provide a second log-likelihood ratio stream; and
- a second decoder configured to process the second log-likelihood ratio stream and to provide a decoded secondary log-likelihood ratio stream.

The first signal processing unit may comprise a first converter configured to convert the decoded primary log-likelihood ratio stream into the primary bitstream; and said second signal processing unit may comprise a second converter configured to convert the decoded secondary log-likelihood ratio stream into the secondary bitstream.

Another embodiment of the invention relates to a method for receiving a secondary bitstream which is transmitted by a secondary signal over a physical transmission channel together with a primary signal having higher signal strength than the secondary signal, wherein said primary signal is generated according to a first transmission standard and said secondary signal is generated according to a second transmission standard, which differs from the first transmission standard; said method comprising the steps of:
- down-converting an input signal that contains said primary and secondary signal, to a baseband complex symbol stream;
- processing the baseband complex symbol stream to provide a primary bitstream transmitted by said primary signal;
- processing the primary bitstream to provide a reconstructed primary symbol stream;
- providing a difference symbol stream by substracting the baseband complex symbol stream and the reconstructed primary symbol stream from each other, said difference symbol stream describing the baseband complex symbol stream without the primary signal; and
- processing the difference symbol stream to provide the secondary bitstream transmitted by said secondary signal.

Another embodiment of the invention relates to a transceiver having a transmitter and at least one receiver as described above.

A further embodiment of the invention relates to a system comprising a first transmitter capable of generating a primary signal, a second transmitter capable of generating a secondary signal, and a receiver as described above.

The first transmitter and the second transmitter may be synchronized or unsynchronized.

In a preferred embodiment, the system comprises a localizing unit configured to determine the receiver's position, and a control unit configured to analyze whether the receiver's location is situated in an area that allows the reception of the secondary signal via the second transmission standard.

Furthermore, the receiver is preferably capable of using a third transmission standard, if the result of the analysis indicates that the receiver's location is outside the range that allows the reception of the secondary signal via the second transmission standard.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended figures and tables. Understanding that these figures and tables depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENTS

The preferred embodiments of the present invention will be best understood by reference to the drawings, wherein identical or comparable parts are designated by the same reference signs throughout.

It will be readily understood that the present invention, as generally described herein, could vary in a wide range. Thus, the following more detailed description of the exemplary embodiments of the present invention, is not intended to limit the scope of the invention, as claimed, but is merely representative of presently preferred embodiments of the invention.

Figure 1:
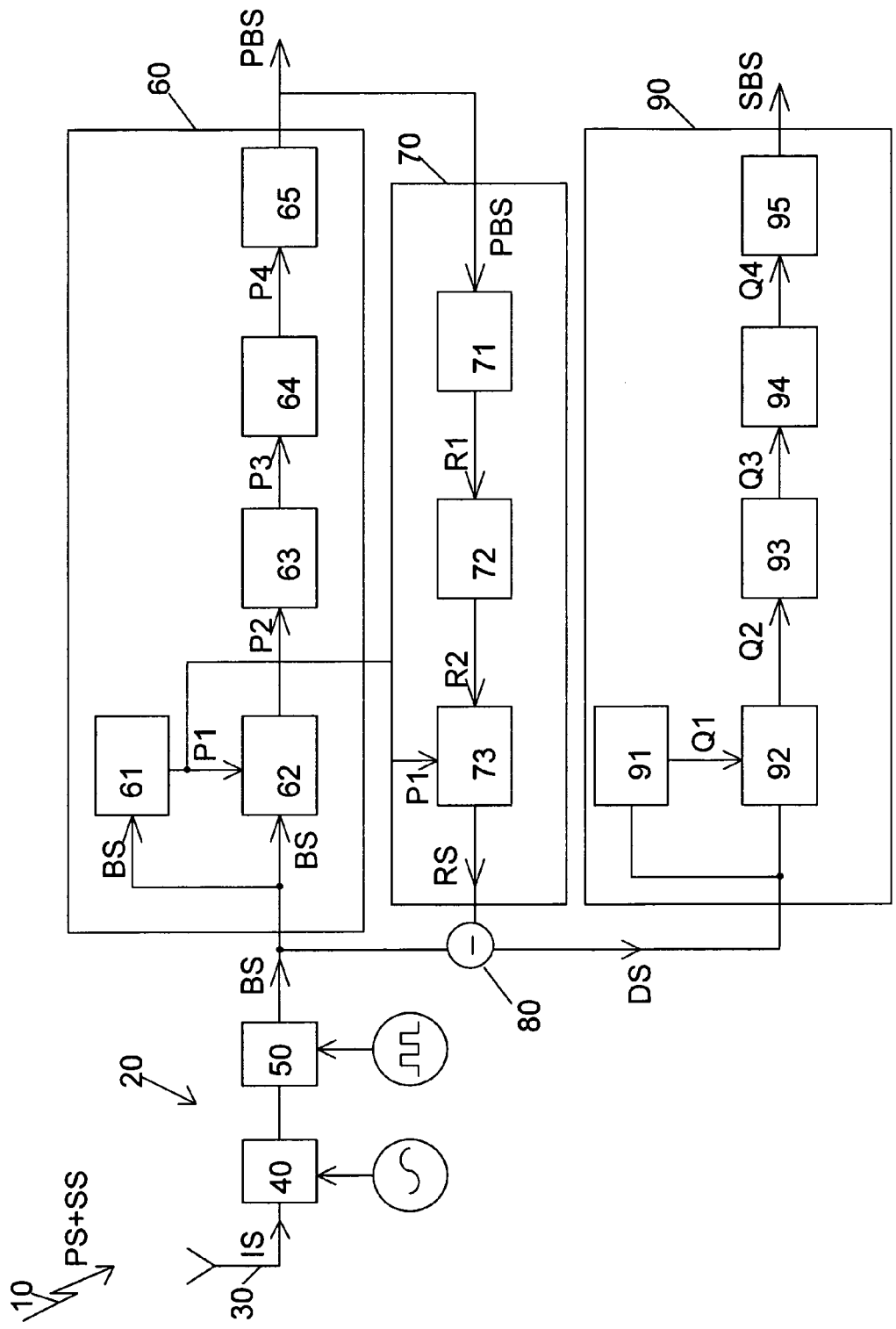
FIG. 1 shows a first embodiment of a receiver according to the present invention.

FIG. 1 shows a wireless physical transmission channel 10 which transmits a primary signal PS and a secondary signal SS. The primary signal PS is generated according to a first transmission standard and has a higher signal strength than the secondary signal SS. The secondary signal SS is generated according to a second transmission standard, which differs from the first transmission standard.

An exemplary embodiment of a receiver 20 comprises an antenna 30 which provides an input signal IS that contains both signals PS and SS. A mixing unit 40 and a down-converter 50 of the receiver 20 process the input signal IS and provide a baseband complex symbol stream which is indicated by reference numeral BS in FIG. 1.

The receiver 20 further comprises a first signal processing unit 60. The first signal processing unit 60 processes the baseband complex symbol stream BS and provides a primary bitstream PBS which comprises the data bits transmitted by the primary signal PS.

A symbol reconstructing unit 70 of the receiver 20 processes the primary bitstream PBS and provides a reconstructed primary symbol stream RS. The reconstructed primary symbol stream RS corresponds to a baseband complex symbol stream that the down-converter 50 would deliver if the input signal IS only contained the primary signal PS.

A subtraction unit 80 is connected to the symbol reconstructing unit 70 and the down-converter 50. The subtraction unit 80 subtracts the reconstructed primary symbol stream RS from the baseband complex symbol stream BS and provides a difference symbol stream DS. The difference symbol stream DS is equivalent to the baseband complex symbol stream BS without the primary signal PS. In other words, the difference symbol stream DS corresponds to a baseband complex symbol stream that the down-converter 50 would deliver if the input signal IS only contained the secondary signal SS.

A second signal processing unit 90 of the receiver 20 is connected to the subtraction unit 80 and processes the difference symbol stream DS. The result is a secondary bitstream SBS that comprises the data bits transmitted by the secondary signal SS.

The first signal processing unit 60 of the receiver 20 comprises a first channel estimator 61 which provides first estimated channel samples P1. The first estimated channel samples P1 describe channel distortions imposed to the primary signal PS by the physical transmission channel 10. Channel estimators are known in the art "OFDM and MC-CDMA for Broadband Multi-User Communications, WLANs and Broadcasting", L. Hanzo, M. Munster, B. Choi and T. Keller, Wiley—IEEE Press, September 2003.

A first equalizer 62 of the first signal processing unit 60 equalizes the baseband complex symbol stream BS and provides a first equalized symbol stream P2. The first equalizer 62 provides the first equalized symbol stream P2 by calculating a deconvolution between the first estimated channel samples P1 generated by the first channel estimator 61, and the baseband complex symbol stream BS.

A first demapper 63, a first decoder 64, and a first converter 65 of the first signal processing unit 60 process the first equalized symbol stream P2 and provide the primary bitstream PBS. To this end, the first demapper 63 processes the first equalized symbol stream P2 and provides a first log-likelihood ratio stream P3.

Figure 2:
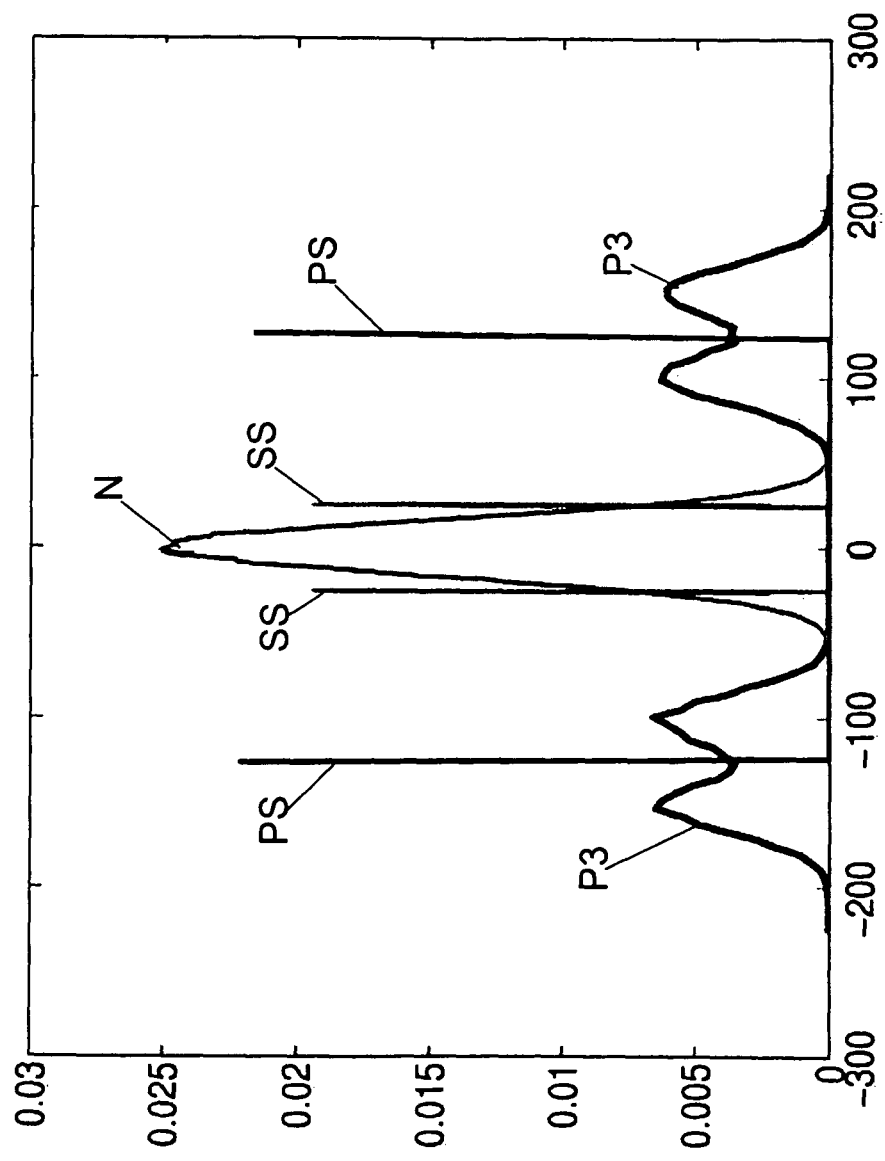
FIGS. 2-4 show log-likelihood ratio densities of signals generated by the receiver of FIG. 1.

The log-likelihood ratio density of the first log-likelihood ratio stream P3 is shown in exemplary fashion for QPSK modulation in FIG. 2. The log-likelihood ratio density results approximately from the convolution of three signals' log-likelihood ratio densities, namely the primary signal PS, the secondary signal SS and noise N. According to the example depicted in FIG. 2, the primary and secondary signals PS and SS have a signal-to-noise ratio of 18 dB and 4 dB, respectively.

Figure 3:
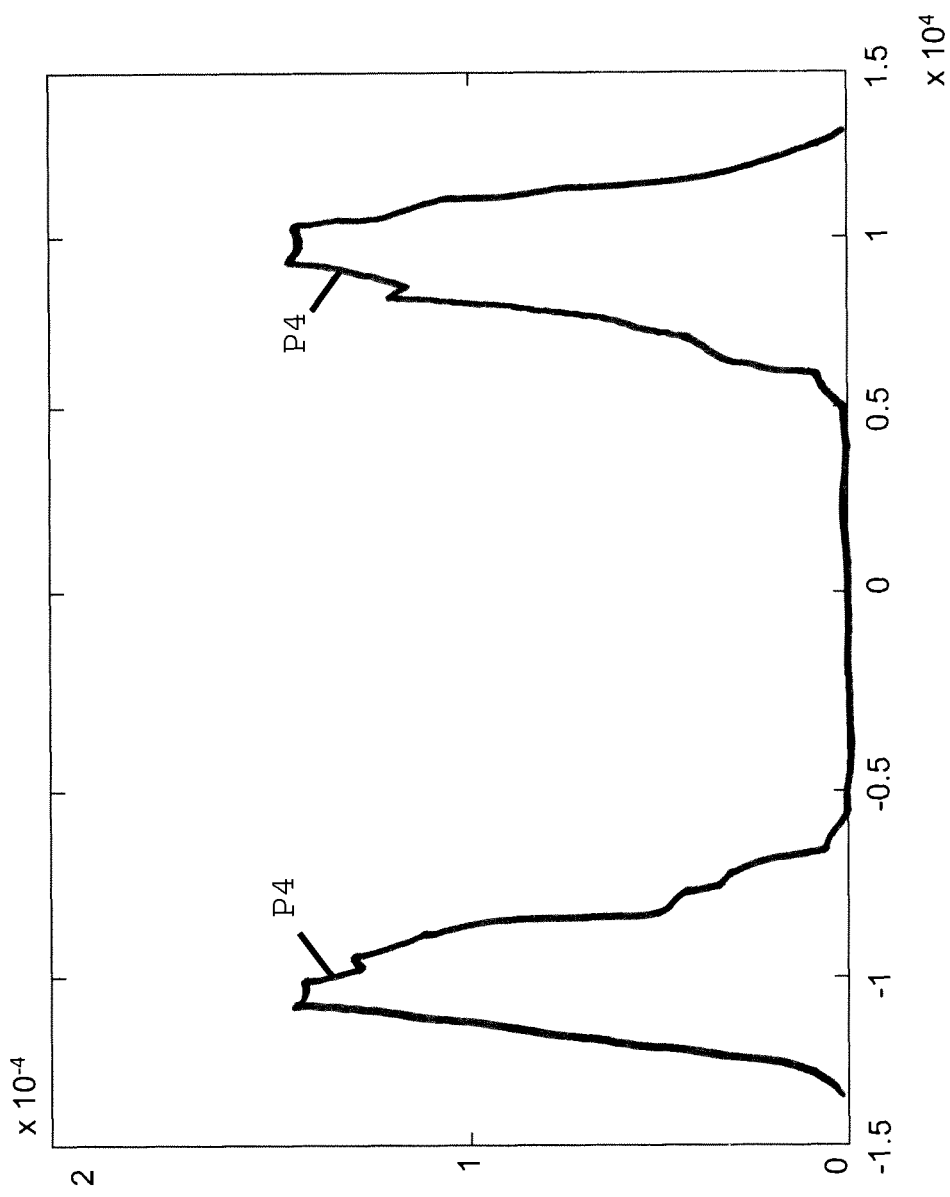

The first decoder 64 processes the first log-likelihood ratio stream P3 and provides a decoded primary log-likelihood ratio stream P4. The decoded primary log-likelihood ratio stream P4 reflects the primary signal, only, since the primary signal PS is stronger than the secondary signal SS. The decoded primary log-likelihood ratio stream P4, which results from the first log-likelihood ratio stream P3, is depicted in FIG. 3.

The decoded primary log-likelihood ratio stream P4 is converted to the primary bitstream PBS by converter 65. As such, the primary bitstream PBS comprises the data bits transmitted by the primary signal PS, only.

The reconstructing unit 70 comprises a first encoder 71 which processes the primary bitstream PBS and provides an encoded first signal bitstream R1. The first encoder 71 may be identical to the encoder which has been used to generate the primary signal PS at the transmitter end (not shown in FIG. 1).

A first mapper 72 of the reconstructing unit 70 processes the encoded first signal bitstream R1 and provides a first signal symbol stream R2. The first mapper 72 may be identical to the mapper which has been used to generate the primary signal PS at the transmitter end (not shown in FIG. 1).

The reconstructing unit 70 further comprises a distortion unit 73 which distorts the first signal symbol stream R2 and provides the reconstructed primary symbol stream RS. The distortion unit 73 distorts the first signal symbol stream R2 based on the first estimated channel samples P1 provided by the first channel estimator 61. To this end, the distortion unit 73 calculates a convolution between the first estimated channel samples P1 of the first channel estimator 61 and the first signal symbol stream R2. As such, the reconstructed primary symbol stream RS corresponds to a baseband complex symbol stream BS that the down-converter 50 would deliver if the input signal IS only contained the primary signal PS.

As already mentioned above, the subtraction unit 80 subtracts the reconstructed primary symbol stream RS from the baseband complex symbol stream BS and provides the difference symbol stream DS. Therefore, the difference symbol stream DS corresponds to the baseband complex symbol stream BS that the down-converter 50 would deliver if the input signal IS only contained the secondary signal SS.

The second signal processing unit 90 comprises a second channel estimator 91 which provides second estimated channel samples Q1 describing channel distortions that correspond to those imposed to the secondary signal SS by the physical transmission channel 10. The channel estimator 91 may be identical with the channel estimator 61 of the first signal processing unit 60.

A second equalizer 92 of the second signal processing unit 90 equalizes the difference symbol stream DS and provides a second equalized symbol stream Q2. To this end, the second equalizer 92 calculates a deconvolution between the second estimated channel samples Q1 generated by channel estimator 91, and the difference symbol stream DS. The equalizer 92 may be identical with the equalizer 62 of the first signal processing unit 60.

Figure 4:
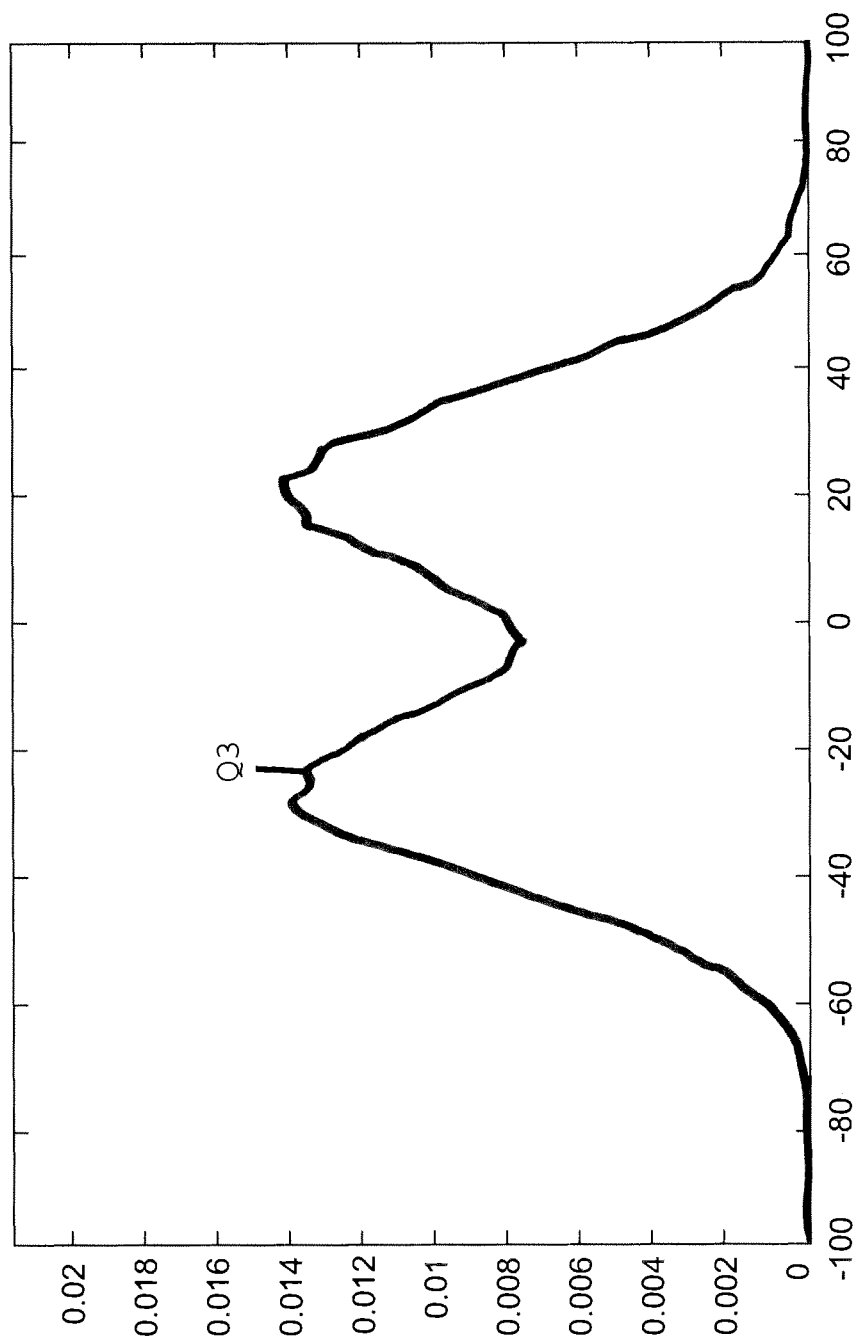

A second demapper 93 of the second signal processing unit 90 processes the second equalized sample stream Q2 and provides a second log-likelihood ratio stream Q3. The log-likelihood ratio density of the second log-likelihood ratio stream Q3 is shown in exemplary fashion in FIG. 4. The demapper 93 may be identical with the demapper 63 of the of the first signal processing unit 60.

A second decoder 94 of the second signal processing unit 90 processes the second log-likelihood ratio stream Q3 and provides a decoded secondary log-likelihood ratio stream Q4. The secondary log-likelihood ratio stream Q4 is converted into the secondary bitstream SBS by a second converter 95 of the second signal processing unit 90.

The decoder 94 and the converter 95 may be identical with the decoder 64 and the converter 65 of the first signal processing unit 60.

Figure 5:
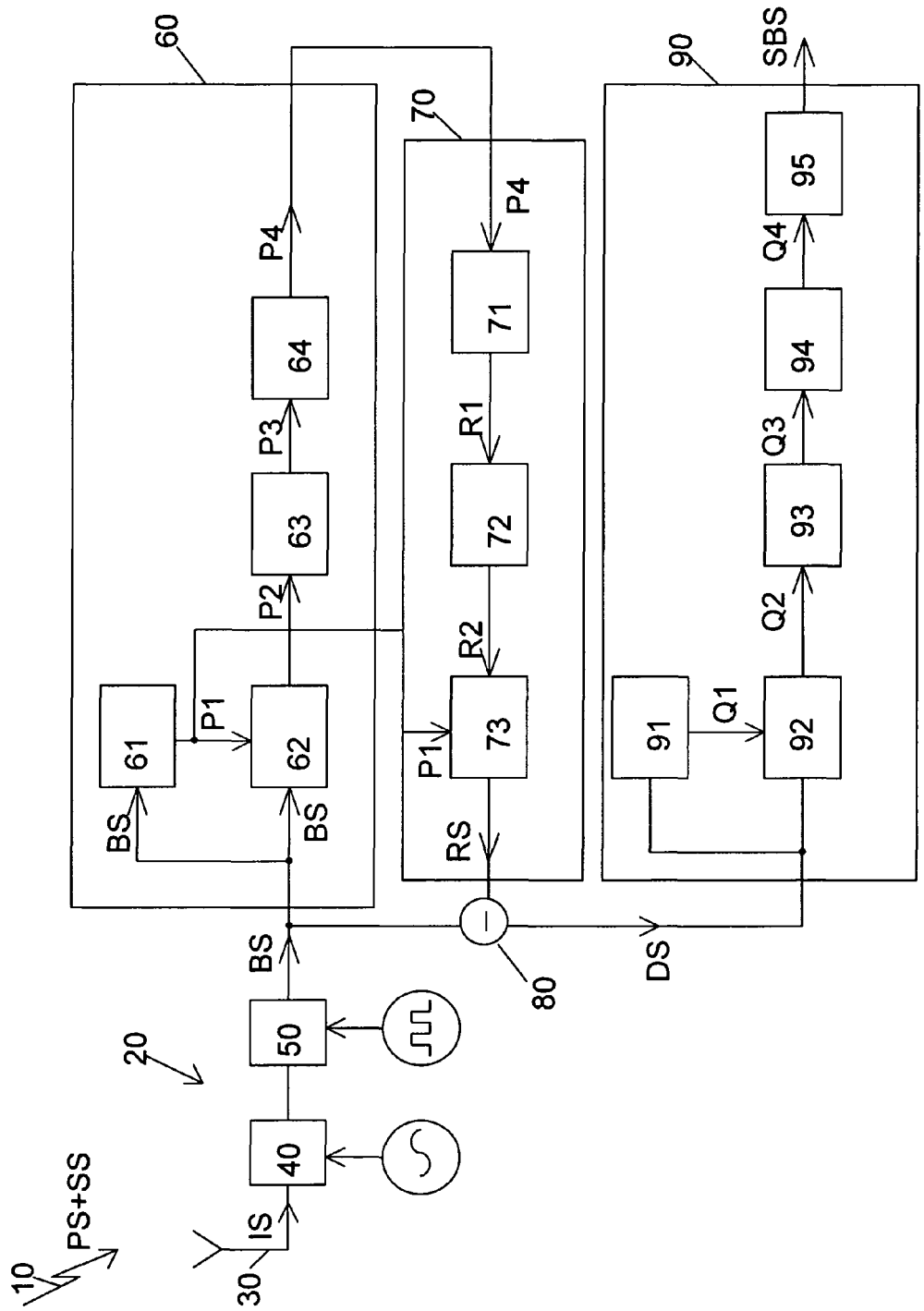
FIG. 5 shows a second embodiment of a receiver according to the present invention.

A second exemplary embodiment of a receiver 20 is shown in FIG. 5. In contrast to FIG. 1, the first encoder 71 of the reconstructing unit 70 is adapted to process the decoded primary log-likelihood ratio stream P4 instead of the primary bit stream PBS. As such, the converter 65 as shown in FIG. 1 may be omitted if only the secondary bitstream SBS needs to be received.

Figure 6:
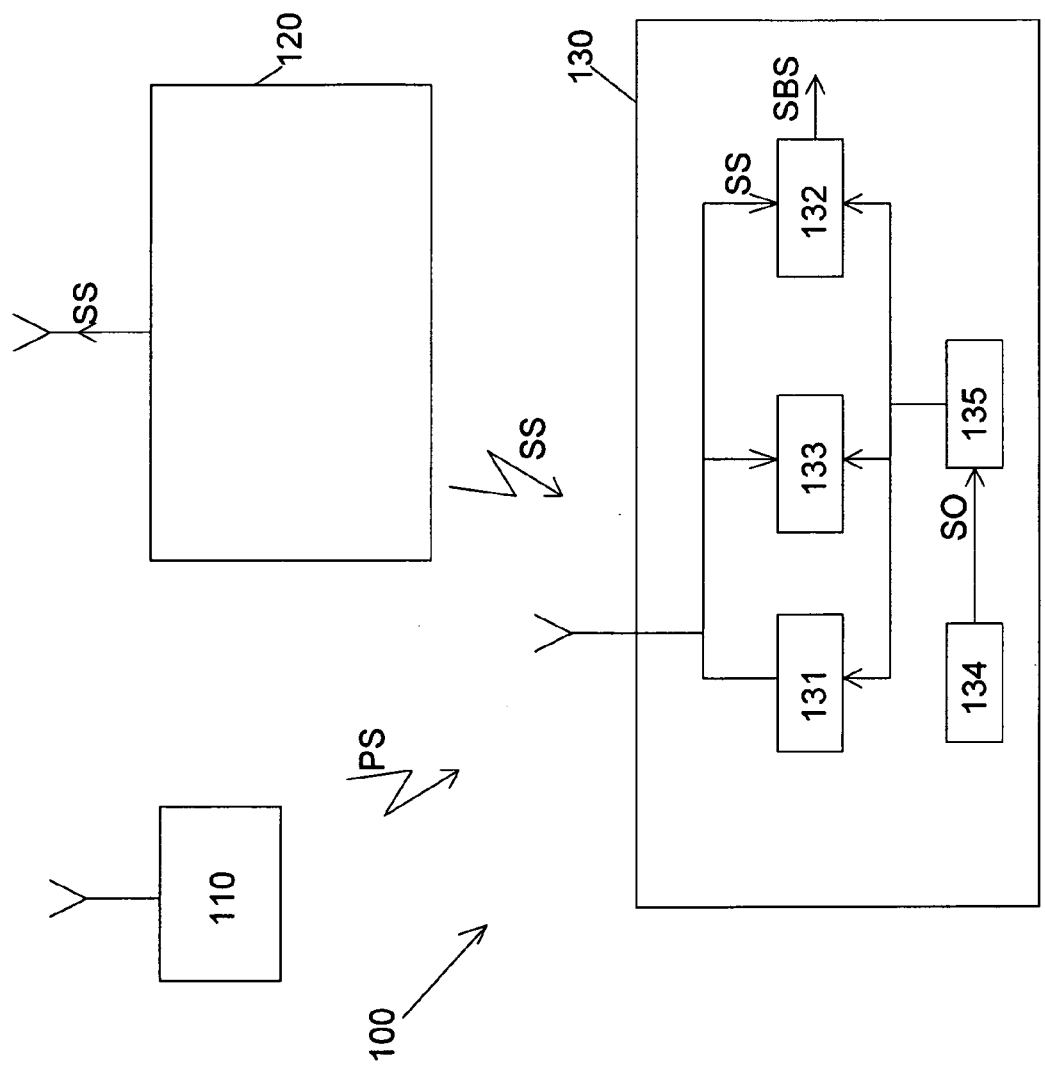
FIGS. 6-9 show a first embodiment of a system according to the present invention, wherein FIGS. 6-9 refer to different points in time during the signal reception.

FIG. 6 shows an exemplary embodiment of a system 100 according to the present invention. The system 100 comprises a first central unit 110 which generates a primary radio signal PS, a second central unit 120 which generates a secondary radio signal SS, and a mobile transceiver 130. The first central unit 110 and the second central unit 120 may be synchronized or unsynchronized. The primary signal PS is transmitted according to a first wireless transmission standard, and the secondary signal is transmitted according to a second wireless transmission standard.

The transceiver 130 comprises a transmitter 131, a first receiver unit 132 for the reception of the secondary signal SS and the extraction of the secondary bitstream SBS from the secondary signal SS, and a second receiver unit 133 for the reception of a signal transmitted according to a third transmission standard. The first receiver unit 132 may comprise the components shown in FIGS. 1 and 5. The transmitter 131 is preferably adapted to generate signals according to the third transmission standard.

The transceiver 130 further comprises a localizing unit 134 which determines the transceiver's position and provides a position signal SO. A control unit 135 connected to the localizing unit 134 analyzes the position signal SO and determines whether the transceiver 130 is situated in an area that allows the reception of the secondary signal SS via the second transmission standard. This area is also referred to as "reception range" hereinafter.

If the transceiver's location is inside the reception range, the transceiver 130 receives the secondary signal SS using the first receiver unit 132 as discussed above with reference to FIGS. 1-5.

Figure 7:
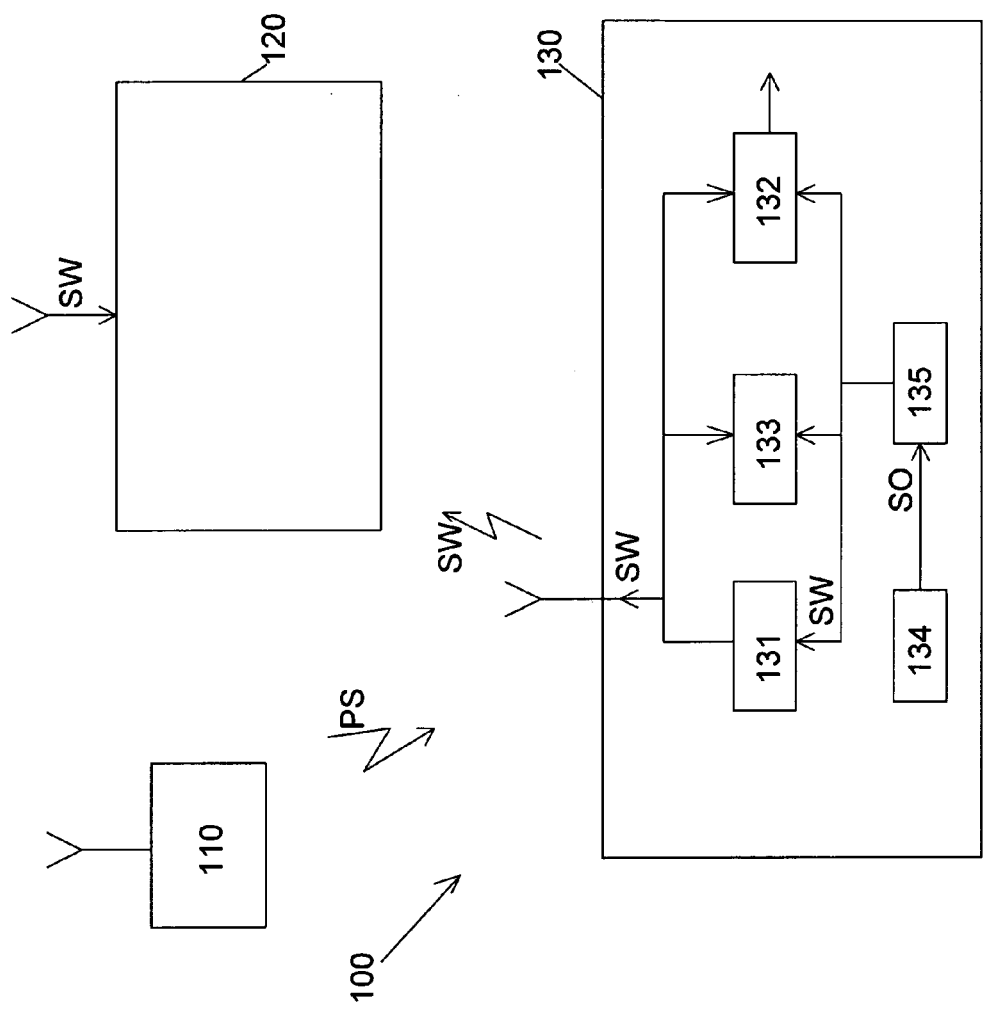
Figure 8:
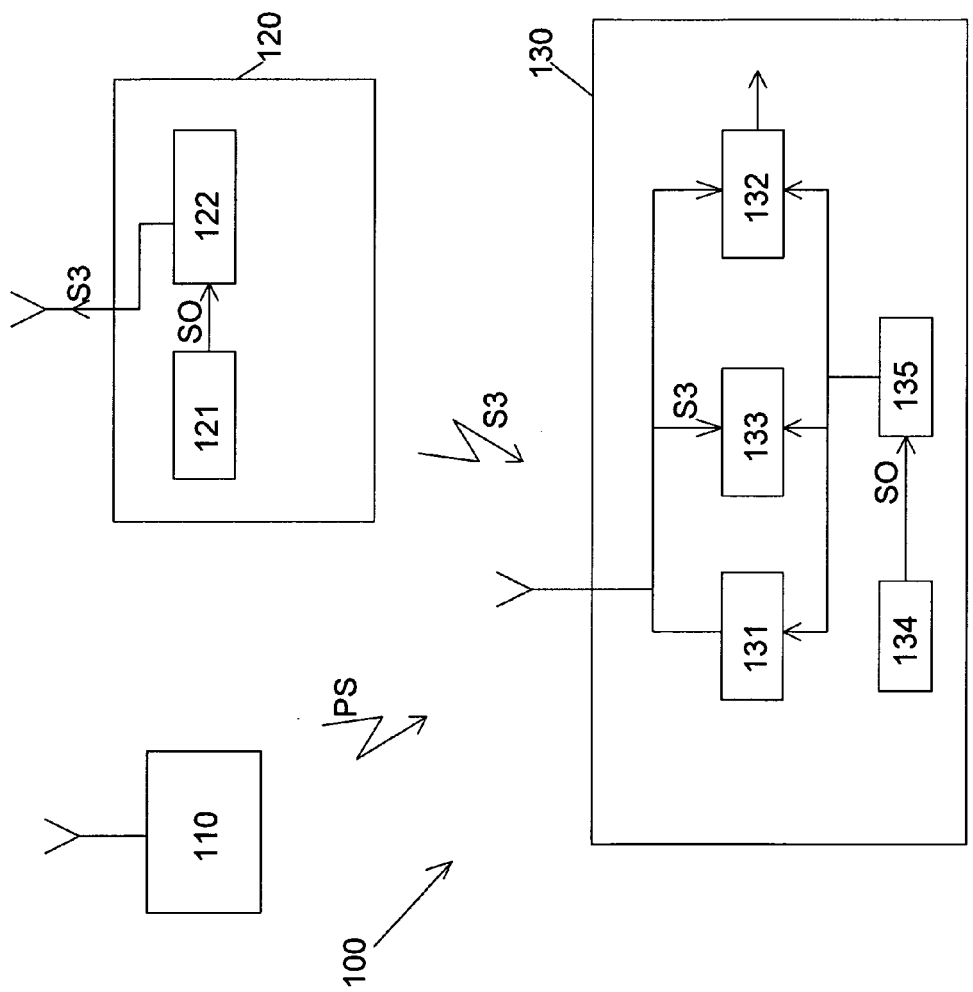

If the transceiver's location is outside the reception range, the control unit 135 sends a switch signal SW via the transmitter 131 to the second central unit 120 (see FIG. 7). The switch signal SW indicates that the transceiver 130 cannot receive signals in the second transmission standard and requires a signal according to the third transmission standard. After receiving the switch signal SW, the second central unit 120 starts communicating with the mobile transceiver 130 on the basis of the third transmission standard, and sends corresponding a signal S3 (see FIG. 8).

Figure 9:
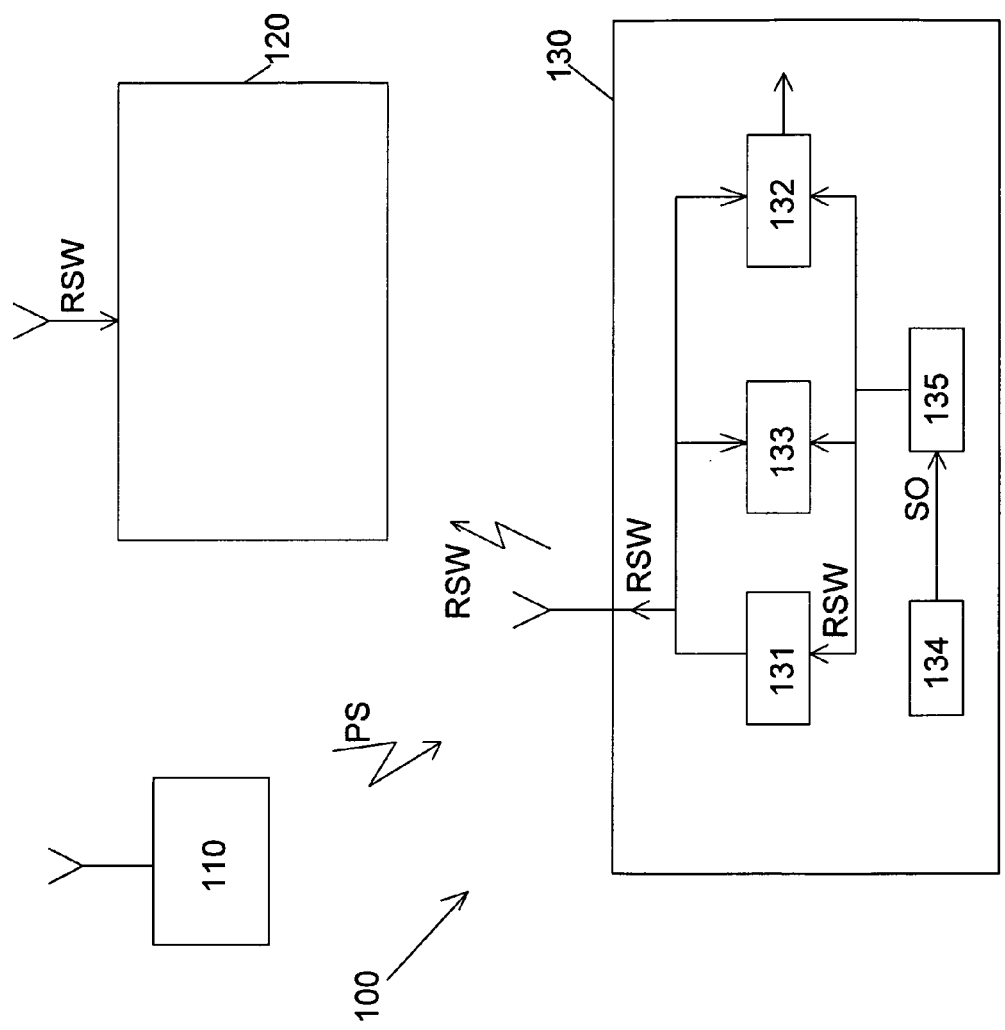

If the evaluation of the position signal SO indicates that the transceiver 130 has re-entered the area that allows the reception of the secondary signal SS via the second transmission standard, the control unit 135 sends a re-switch signal RSW via the transmitter 131 to the second central unit 120 as shown in FIG. 9. The re-switch signal RSW indicates that the transceiver 130 may again receive signals in the second transmission standard and requests further communication signals in the second transmission standard. After receiving the re-switch signal RSW, the second central unit 120 transmits signals to the mobile transceiver 130 using the second transmission standard as shown in FIG. 6.

In the exemplary embodiments shown in FIGS. 6-9, the mobile transceiver 130 comprises a localizing unit 134 and a control unit 135 which is connected to the localizing unit 134 and analyzes the position signal SO of the localizing unit 134. Alternatively or additionally, such a localizing unit and such a control unit may (also) be located in the second central unit 120 as shown in FIG. 10.

Figure 10:
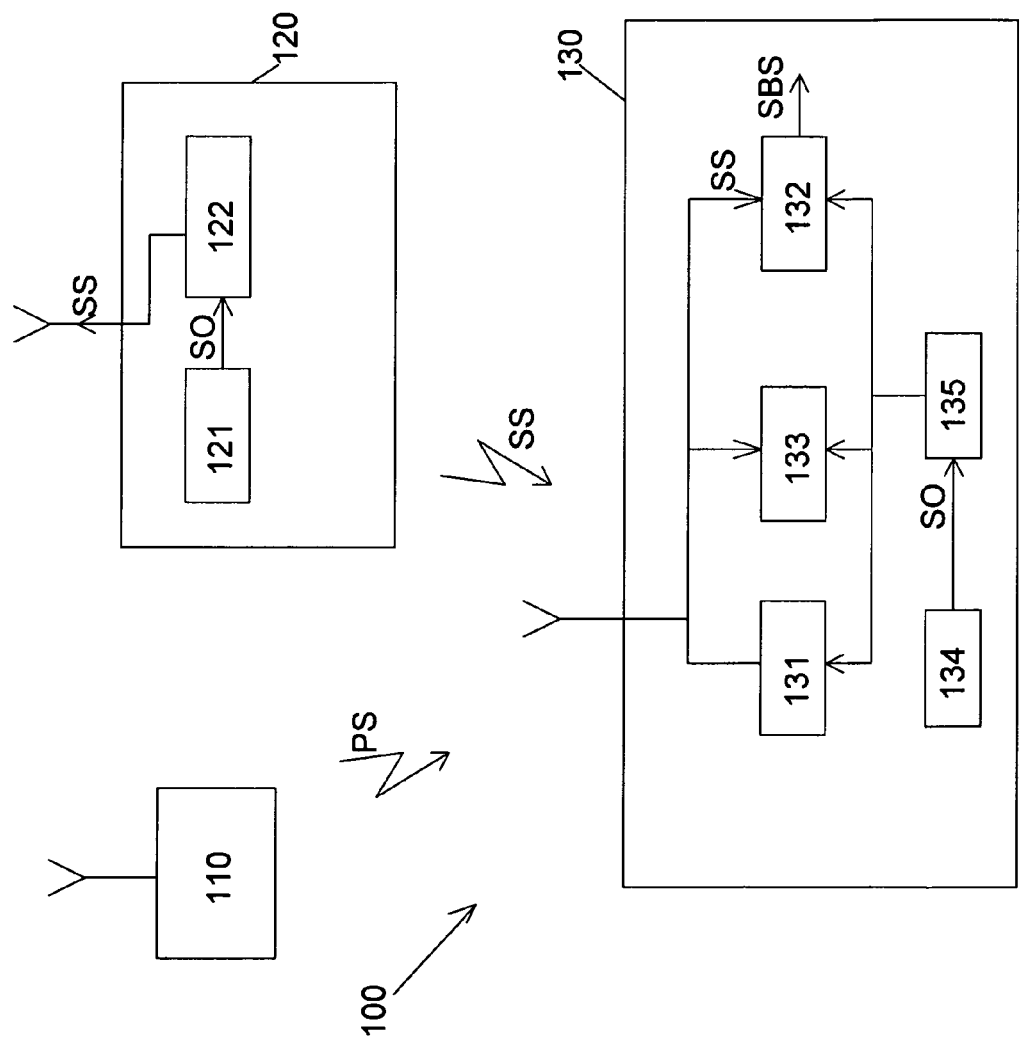
FIGS. 10-12 show a second embodiment of a system according to the present invention, wherein FIGS. 10-12 refer to different points in time during the signal reception.

In the exemplary embodiment of FIG. 10, the second central unit 120 comprises a localizing unit 121 which determines the transceiver's position and provides a position signal SO. A control unit 122 of the central unit 120 is connected to the localizing unit 121 and analyzes the position signal SO. The control unit 122 further determines whether the transceiver 130 is situated in an area that allows the reception of the secondary signal SS via the second transmission standard.

The control unit 122 of the central unit 120 may be connected to an internal or external databank that locally defines the "reception range" that allows the reception of the secondary signal SS via the second transmission standard.

Figure 11:
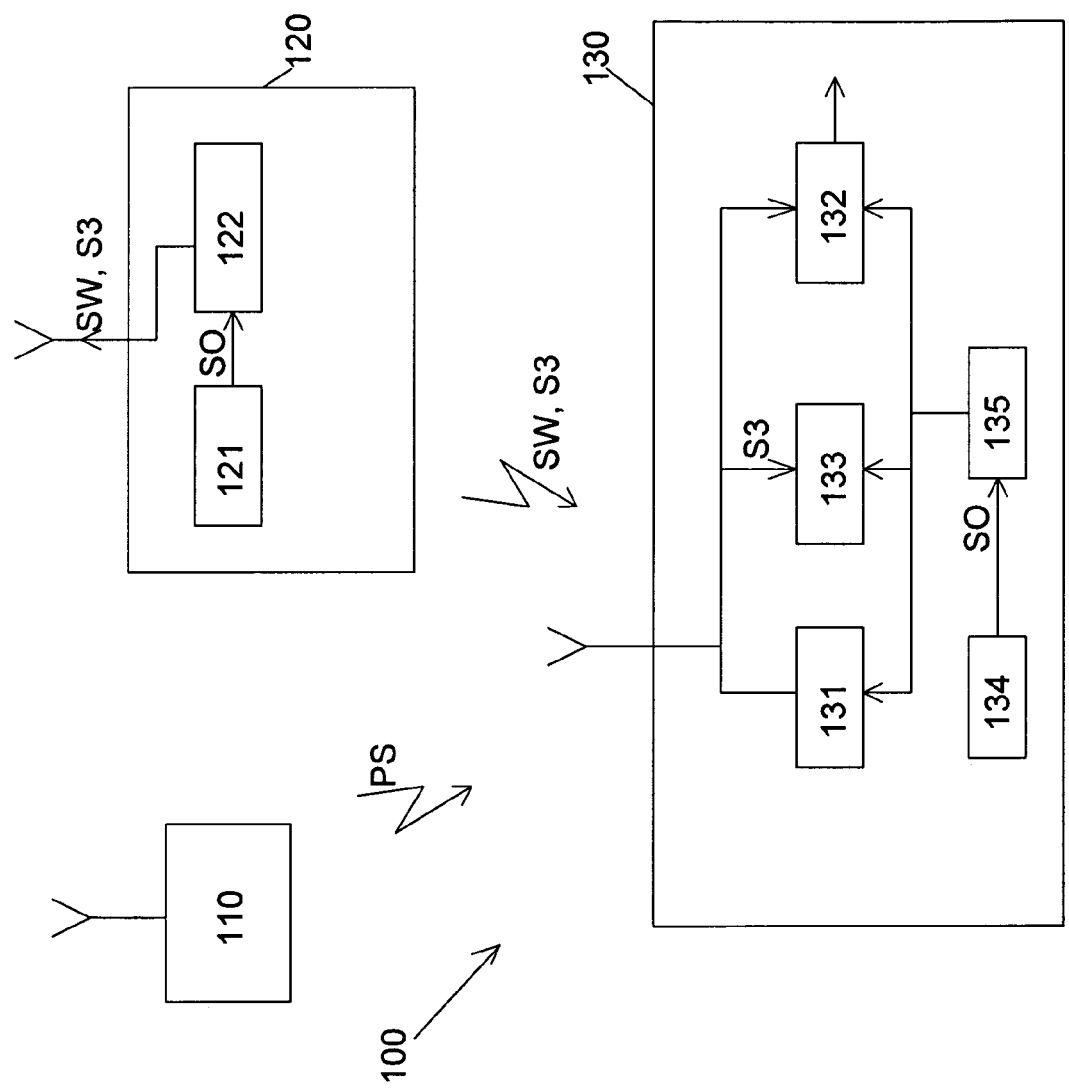

If the transceiver's location is outside this area, the control unit 122 sends a switch signal SW to the transceiver 130. The switch signal SW indicates that the transceiver 130 should receive signals in the third transmission standard. After receiving the switch signal SW, the transceiver 130 starts receiving signals S3 using its second receiver unit 133 (see FIG. 11).

Figure 12:
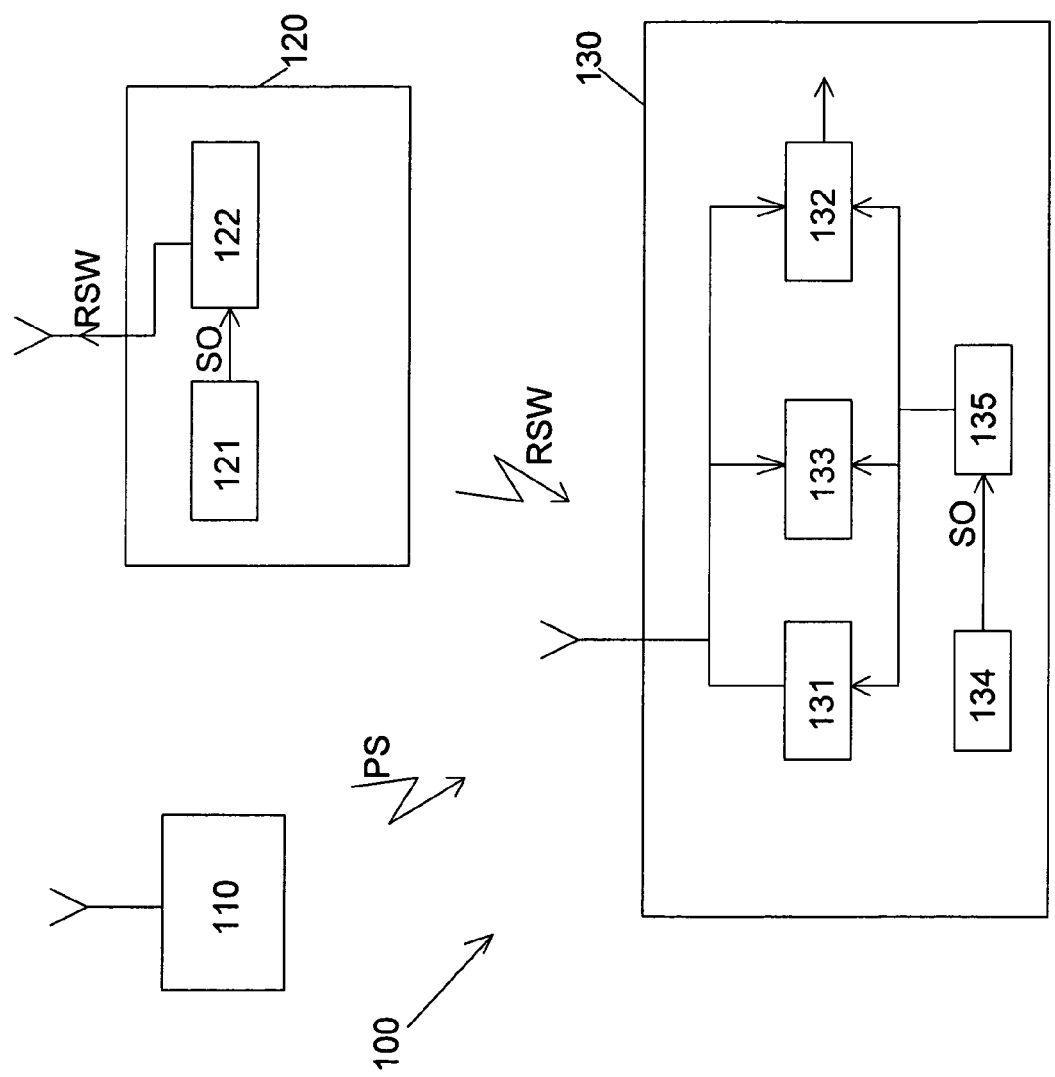

If the evaluation of the position signal SO indicates that the transceiver 130 has re-entered the "reception range" that allows the reception of the secondary signal SS via the second transmission standard, the control unit 122 sends a reswitch signal RSW to the transceiver 130 as shown in FIG. 12. The re-switch signal RSW indicates that the transceiver 130 may receive signals in the second transmission standard. After receiving the re-switch signal RSW, the transmitter 130 starts receiving signals SS using its first receiver unit 132 (see FIG. 10).

REFERENCE SIGNS 10 transmission channel
20 receiver
30 antenna
40 mixing unit
50 down-converter
60 first signal processing unit
61 first channel estimator
62 first equalizer
63 first demapper
64 first decoder
65 first converter
70 symbol reconstructing unit
71 first encoder
72 first mapper
73 distortion unit
80 subtraction unit 90 second signal processing unit
91 second channel estimator
92 second equalizer
93 second demapper
94 second decoder
95 second converter
100 system
110 first central unit
120 second central unit
121 localizing unit
122 control unit
130 mobile transceiver
131 transmitter
132 first receiver unit
133 second receiver unit
134 localizing unit
135 control unit
BS baseband complex symbol stream
DS difference symbol stream
IS input signal
N noise
PBS primary bitstream
PS primary signal
P1 first estimated channel samples
P2 first equalized symbol stream
P3 first log-likelihood ratio stream
P4 decoded primary log-likelihood ratio stream
Q1 second estimated channel samples
Q2 second equalized symbol stream
Q3 second log-likelihood ratio stream
Q4 decoded secondary log-likelihood ratio stream
RS reconstructed primary symbol stream
RSW re-switch signal
R1 encoded first signal bitstream
R2 first signal symbol stream
SO position signal
SS secondary signal
SW switch signal
S3 signal

The invention claimed is:

1. Receiver capable of receiving a secondary bitstream which is transmitted by a secondary signal over a physical transmission channel together with a primary signal having higher signal strength than the secondary signal, said primary signal being generated according to a first transmission standard and said secondary signal being generated according to a second transmission standard, which differs from the first transmission standard; said receiver comprising:
   a down-converter configured to convert an input signal that contains said primary and secondary signals, to a baseband complex symbol stream;
   a first signal processing unit configured to process the baseband complex symbol stream and to provide a primary bitstream transmitted by said primary signal or a decoded primary log-likelihood ratio stream;
   a symbol reconstructing unit configured to process the primary bitstream or the decoded primary log-likelihood ratio stream and to provide a reconstructed primary symbol stream;
   a subtraction unit configured to provide a difference symbol stream by substracting the baseband complex symbol stream and the reconstructed primary symbol stream from each other, said difference symbol stream describing the baseband complex symbol stream without the primary signal; and
   a second signal processing unit configured to process the difference symbol stream and to provide the secondary bitstream transmitted by said secondary signal.

2. Receiver of claim 1 wherein said first signal processing unit comprises
   a first channel estimator configured to provide first estimated channel samples describing channel distortions imposed to the primary signal by the physical transmission channel;
   a first equalizer configured to equalize the baseband complex symbol stream and to provide a first equalized symbol stream; and
   a first demapper and a first decoder, said first demapper and said first decoder configured to process the first equalized symbol stream and to provide the primary bitstream.

3. Receiver of claim 1 wherein said first signal processing unit comprises
   a first channel estimator configured to provide first estimated channel samples describing channel distortions imposed to the primary signal by the physical transmission channel;
   a first equalizer configured to equalize the baseband complex symbol stream and to provide the first equalized symbol stream;
   a first demapper configured to process the first equalized symbol stream and to provide a first log-likelihood ratio stream; and
   a first decoder configured to process the first log-likelihood ratio stream and to provide a decoded primary log-likelihood ratio stream.

4. Receiver of claim 3 wherein said first signal processing unit further comprises a converter configured to convert the decoded primary log-likelihood ratio stream into the primary bitstream.

5. Receiver of claim 3 wherein the first equalizer is configured to provide said first equalized symbol stream by calculating a deconvolution between the first estimated channel samples and the baseband complex symbol stream.

6. Receiver of claim 3 wherein said symbol reconstructing unit comprises
   a first encoder configured to process the primary bitstream or the decoded primary log-likelihood ratio stream and to provide an encoded first signal bitstream;
   a first mapper configured to process the encoded first signal bitstream and to provide a first signal symbol stream; and
   a distortion unit configured to distort the first signal symbol stream and to provide said reconstructed primary symbol stream, said distortion unit distorting the first signal symbol stream based on said first estimated channel samples provided by said first channel estimator.

7. Receiver of claim 6 wherein the distortion unit is configured to provide said first signal symbol stream by calculating a convolution between the first estimated channel samples of the first channel estimator and the first signal symbol stream.

8. Receiver of claim 1 wherein said second signal processing unit comprises
   a second channel estimator configured to provide second estimated channel samples describing channel distortions imposed to the secondary signal by the physical transmission channel;
   a second equalizer configured to equalize the difference symbol stream and to provide a second equalized symbol stream;

a second demapper configured to process the second equalized sample stream and to provide a second log-likelihood ratio stream; and a second decoder configured to process the second log-likelihood ratio stream and to provide a decoded secondary log-likelihood ratio stream.

9. Receiver of claim 8 wherein said second signal processing unit further comprises a converter configured to convert the decoded secondary log-likelihood ratio stream into the secondary bitstream.

10. Receiver of claim 1 wherein said second signal processing unit comprises
   a second channel estimator configured to provide second estimated channel samples describing channel distortions imposed to the secondary signal by the physical transmission channel;
   a second equalizer configured to equalize the difference symbol stream and to provide a second equalized symbol stream; and
   a second demapper and a second decoder, said second demapper and said second decoder configured to process the second equalized sample stream and to provide the secondary bitstream.

11. Receiver of claim 1
(a) wherein said first signal processing unit comprises
   a first channel estimator configured to provide first estimated channel samples describing channel distortions imposed to the primary signal by the physical transmission channel;
   a first equalizer configured to equalize the baseband complex symbol stream and to provide a first equalized symbol stream, wherein the first equalizer is configured to provide said first equalized symbol stream by calculating a deconvolution between the first estimated channel samples and the baseband complex symbol stream;
   a first demapper configured to process the first equalized sample stream and to provide a first log-likelihood ratio stream; and
   a first decoder configured to process the first log-likelihood ratio stream and to provide a decoded primary log-likelihood ratio stream;
(b) wherein said symbol reconstructing unit comprises
   a first encoder configured to process the primary bitstream or the decoded primary log-likelihood ratio stream and to provide an encoded first signal bitstream;
   a first mapper configured to process the encoded first signal bitstream and to provide a first signal symbol stream; and
   a distortion unit configured to distort the first signal symbol stream and to provide said reconstructed primary symbol stream, said distortion unit distorting the first signal based on said first estimated channel samples provided by said first channel estimator, wherein the distortion unit is configured to provide said first signal symbol stream by calculating a convolution between the first estimated channel samples and the first signal symbol stream;
(c) wherein said second signal processing unit comprises
   a second channel estimator configured to provide second estimated channel samples describing channel distortions imposed to the secondary signal by the physical transmission channel;
   a second equalizer configured to equalize the difference symbol stream and to provide a second equalized symbol stream;
   a second demapper configured to process the second equalized sample stream and to provide a second log-likelihood ratio stream; and
   a second decoder configured to process the second log-likelihood ratio stream and to provide a decoded secondary log-likelihood ratio stream.

12. Receiver of claim 11
   wherein said first signal processing unit comprises a first converter configured to convert the decoded primary log-likelihood ratio stream into the primary bitstream; and
   wherein said second signal processing unit comprises a second converter configured to convert the decoded secondary log-likelihood ratio stream into the secondary bitstream.

13. System comprising a first transmitter capable of generating a primary signal, a second transmitter capable of generating a secondary signal, and a receiver according to claim 1.

14. System of claim 13 wherein the first transmitter and the second transmitter are synchronized.

15. System of claim 13 wherein the first transmitter and the second transmitter are unsynchronized.

16. System of claim 13 comprising
   a localizing unit configured to determine the receiver's position;
   a control unit configured to analyze whether the receiver's location is situated in an area that allows the reception of the secondary signal via the second transmission standard.

17. System of claim 16 wherein the receiver is capable of using a third transmission standard, if the result of the analysis indicates that the receiver's location is outside the range that allows the reception of the secondary signal via the second transmission standard.

18. Method for receiving a secondary bitstream which is transmitted by a secondary signal over a physical transmission channel together with a primary signal having higher signal strength than the secondary signal, wherein said primary signal is generated according to a first transmission standard and said secondary signal is generated according to a second transmission standard, which differs from the first transmission standard; said method comprising the steps of:
   down-converting an input signal that contains said primary and secondary signals, to a baseband complex symbol stream;
   processing the baseband complex symbol stream to provide a primary bitstream transmitted by said primary signal;
   processing the primary bitstream to provide a reconstructed primary symbol stream;
   providing a difference symbol stream by substracting the baseband complex symbol stream and the reconstructed primary symbol stream from each other, said difference symbol stream describing the baseband complex symbol stream without the primary signal; and
   processing the difference symbol stream to provide the secondary bitstream transmitted by said secondary signal.

* * * * *